W. TRACY.
STEERING GEAR ATTACHMENT FOR MOTOR VEHICLES.
APPLICATION FILED JUNE 6, 1917.
1,267,289.
Patented May 21, 1918.
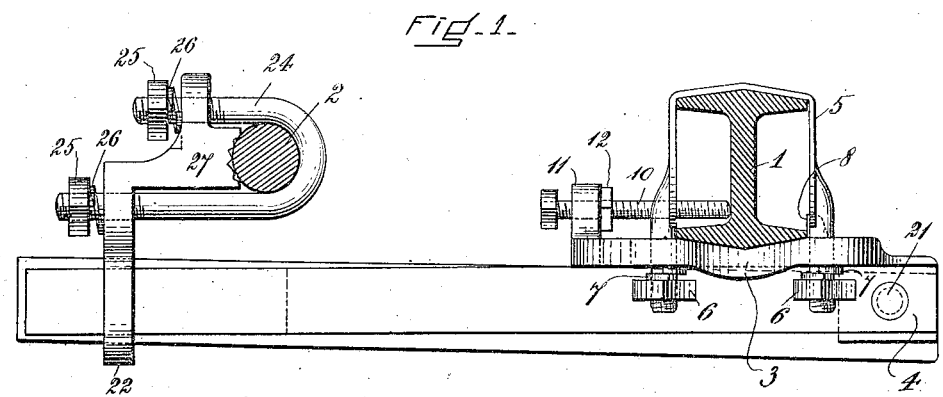
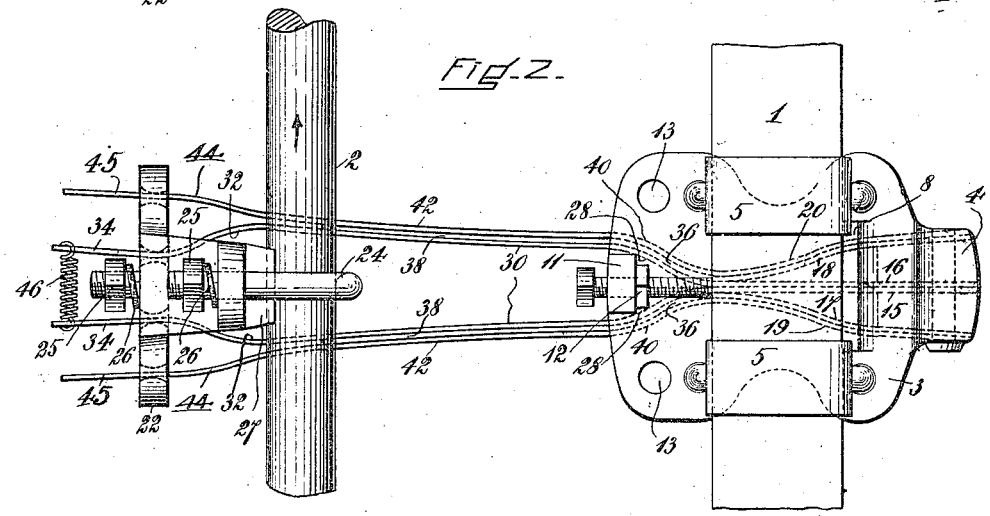

UNITED STATES PATENT OFFICE.

WELLINGTON TRACY, OF WINTHROP, MASSACHUSETTS.

STEERING-GEAR ATTACHMENT FOR MOTOR-VEHICLES.

1,267,289.  Specification of Letters Patent.  Patented May 21, 1918.

Application filed June 6, 1917. Serial No. 173,092.

*To all whom it may concern:*

Be it known that I, WELLINGTON TRACY, of Winthrop, in the county of Suffolk and State of Massachusetts, a citizen of the United States, have invented a new and useful Improvement in Steering-Gear Attachments for Motor-Vehicles, of which the following is a full, clear, and exact description, reference being had to the accompanying drawings forming a part of this specification in explaining its nature.

The present invention relates to that type of attachment which, coupled with the steering gear of the vehicle, tends to maintain its front wheels in straight alinement with the rear wheels and to return them to such alined position when they have been laterally deflected, whatever the cause of such deflection.

The following are among the objects of my invention:—

To provide an attachment of the above character which will exert a very strong influence upon the steering gear for returning the wheels to their normal position; in fact, such strength that the wheels will be so returned independently of any action of the operator under ordinary road conditions;

At the same time to provide a device possessing such flexibility as will permit the operator to readily turn the wheels even to the limit of their permitted deflection and without undue stress upon the steering gear and its operating mechanism;

To provide a device which will continue to perform its function even in case of breakage of the steering gear, and To provide a device which will be absolutely noiseless by compensating for all loose motion in the operating parts.

My invention can best be seen and understood by reference to the drawings in which I have shown it applied to the front axle and steering bar connection of an automobile, such portions of these parts only being shown as are necessary to a proper understanding of the device, and in which—

Figure 1 is a side elevation of the attachment, those parts to which it is secured being shown in section.

Fig. 2 is a plan.

Fig. 3 is a front elevation, and

Fig. 4 is a front elevation of one of the connecting parts of the device to which reference will later be made.

Referring to the drawings:—

1 represents the front axle and 2 the tie rod which joins the knuckles (not shown) of the usual type of steering mechanism for an automobile. According to its customary operation the tie rod 2 is movable endwise in reverse directions in relation to the fixed axle as the forward wheels of the vehicle are turned to the right or left. It is to this tie rod, for maintaining it together with the entire steering mechanism and front wheels in a normal centralized position as above pointed out, that force is applied by the attachment comprising my invention, to which reference will now be made.

Fixed to the axle 1 is a spring-holding member or bracket 3 to which is fixedly secured a number of leaf springs, to which reference will later be made. This bracket consists of a plate or casting adapted to fit against the under side of the axle and provided upon its under side with a butt 4 to which the springs are secured. The holding member 3 is fixed to the axle by U-shaped bolts 5 passed around the axle in the manner of straps and through the holding member, the ends of the bolts being secured to the member by means of nuts 6 and interposed lock washers 7. A further fixing of the spring-holding member is attained, especially against torsional displacement, by a rib 8 on the upper side of the member providing a bearing for the side or edge of the axle. Bearing against the opposite side of the axle is a bolt 10 which extends through a boss 11 upon the top side of the holding member and which bolt is held in place after being turned to engage the axle by means of a lock nut 12. Thus retained, the holding member may be secured to the axle in any properly localized position. In order to provide for axles of different widths or sizes the holding member is preferably provided with an auxiliary set of openings 13 through which the ends of the U-bolts may extend, a proper gage of U-bolts being used in such connection. The permitted adjustability of the bolt 10 admits of its being applied to any type of axle.

Fixed to the butt 4 of the holding member 3 are a series of springs, the same being relatively thin leaf springs 15, 16, 17, 18, 19 and 20, respectively. The particular form and relative arrangement and adaptation of these springs will later be referred to. The springs are secured to the butt 4 to extend therefrom beneath the holder 3 and thence outwardly in the following manner: The ends of the springs 15 and 16 are brought together in parallel arrangement and fit within a socket or opening within the butt. The springs 17 and 18 are arranged to bear against the outer sides of the butt, and the springs 19 and 20 outside the springs 17 and 18, all being secured to the butt by means of a rivet 21 extending through the combined parts and by which they are bound together.

The outer or free ends of the springs 15, 16; 19, 20 extend respectively through a spring-retaining slotted member or plate 22. 23 represents the slots in the plate through which the springs extend. Each of these slots has the general form of the spring extending through it and is made sufficiently large to admit of the endwise play of the spring within the slot as occasion may require.

The slotted member or plate 22 is fixed to the tie rod 2 by means of a U-shaped bolt 24 which extends around the rod and the free ends of which pass through the plate and are secured by nuts 25 and suitably-interposed washers 26. Upon the tightening of the nuts the portion 27 of the plate together with the U-shaped bolt 24 will embrace the rod in the manner of a clamp and thereby securely fix the plate to the tie rod. It will also be observed that the portion 27 of the plate 22 is offset from the main body of the plate in such manner that when the plate is fixed to the tie rod the body thereof or that portion through which the springs are extending, is located forward of the rod and is for the purpose of permitting the use of longer springs than the length of the normal space separating the tie rod from the axle 1 or bracket 3 secured to it, to which the inner ends of the springs are secured. The form of the springs, their relationship to one another and to the members with which they are in engagement is as follows: As above described, the inner ends of the springs 15 and 16 are brought together to lie in parallel alinement contacting with one another and are thus socketed within the butt 4 of the holding member or bracket 3. Such relationship of the springs is continued for some little distance forward of the butt to where the springs are bent outwardly in reverse directions by bends 28 therein. From the bends 28 the springs extend forward by portions 30 in spaced substantially parallel relationship to one another to where both springs turn inwardly by bends 32 therein. Thence the springs extend through the slots in the retaining member or plate 22, 34 representing the ends of the springs extending beyond the plate.

The springs 17 and 18, respectively, are secured, as before pointed out, to the outer sides or faces of the butt of the spring-holding member. From the point of their retention the springs extend inwardly in reverse directions to where both springs engage the springs 15 and 16 at the points of their bends 28. There the springs 17 and 18 are provided with bends 36 and thence project forward by portions 38 which lie in contact with the portions 30 of the springs 15 and 16, the ends of the extended portions 38 of the springs 17 and 18 terminating just short of the bends 32 in the springs 15 and 16.

The springs 19 and 20 fastened to the butt 4 of the holding member outside the springs 17 and 18, follow the forward extension of these springs in contact with them to the points of their bends 36. There the springs 19 and 20 are turned outwardly in reverse directions by bends 40 which follow around the bends 36 in the springs 17 and 18, respectively. From the bends 40 the springs 19 and 20 extend forward by portions 42 in contact with the portions 38 of the springs 17 and 18 to points just beyond the outer free ends of these springs and thence are bent outwardly by portions 44, which pass respectively through the slots in the retaining plate or member 22. 45 represents the ends of these springs extending beyond the plate.

Between the outer free ends 34 of the springs 15 and 16, beyond the retaining plate 22, is compressed a coil spring 46. This spring is retained by the ends 47 thereof extending through openings in the ends 34 of the springs 15 and 16.

Thus arranged and when normally disposed, that is, when no stress is being brought to bear upon them, all the springs combine to brace and otherwise yieldingly reinforce one another.

Those portions of the springs 17, 18, 19 and 20, which lie between the butt to which they are secured and the first bends in these respective springs operate to brace the springs 15 and 16 so that the inner portions of the springs 15 and 16, which project forward in parallel alinement with each other from the butt to which they are secured, are substantially immovable and these springs will initially turn or bend from the points of the bends 28 therein. Owing to the form of the springs 17, 18; 19, 20, these springs will initially bend from the points of the bends 36 and 40 formed respectively in them so that the portions of all of the springs which lie between the butt 4 to which they are secured and the first bends therein are practically immovable, yielding only to great stress and thereby relieving the butt of the torsional strain which might otherwise be brought to bear upon it and otherwise assisting in the effectiveness of the device, as will later be pointed out.

The ends 34 of the springs 15 and 16 will be spread by the action of the coil spring 46 compressed between them to bear against the outer edges of the slots in the plate or member 22 through which these springs are extended, while the ends of the springs 19 and 20, respectively, by reason of the bends 44 therein bear tensionally against the outer edges of the slots in the slotted plate or member 22 through which these springs extend. With all the springs which pass through the retaining member 22 thus normally held under tension in yielding contact with it, all lost motion between the springs and the member is eliminated preliminary to the action which the device has during its active operation, and accordingly all chattering or noise is eliminated when the parts are in their normal position and no active stress is being brought to bear upon the device.

In the operation of the device, as the tie rod 2 of the steering mechanism is moved in one direction or the other, depending as the wheels are turned to the right or left, all of the springs will be bent to resist such motion and upon the conclusion thereof will tend to restore the parts to their normal position, when the wheels will all be in alinement as previously pointed out. The distortion of the springs will proceed initially from the points of the bends 28, 36 and 40 therein and this irrespective of whether the springs are bent in one direction or the other. In other words, all of the springs will bend from a point removed from the base to which they are secured, thereby relieving the base, or means attaching the springs to it, and adding to the flexibility of the entire device. The bracing and tensional reinforcement of the inner set of springs 15 and 16 by the outer sets of springs will continue and even increase in the amount of tensional resistance, the flexibility of the device continuing whatever the distortion may be. Not only will the inner set of springs be reinforced at the points of their initial bends, but they will also be reinforced throughout a substantial part of their length. In this connection it may be explained that not only all the springs are distorted at the points of their initial bends, but all the springs beyond these points will become bent or distorted, which action is resisted and stress exerted to restore the springs and connected parts to their normal position by the bearing of the springs against one another, the combined springs making a very strong and flexible device.

The shortening of the springs 17 and 18 permits these springs to play between the outer and inner sets of springs. Assuming, for example, that the tie rod is moved in the direction of the arrow indicated upon it, all the springs including the springs 17 and 18 will be distorted in the same general direction. Owing to the freedom of the springs 17 and 18, however, due to the fact that they do not engage the slotted spring-retaining member 22, the portion 38 of the spring 17 will bear against the portion 42 of the spring 19 to resist its distortion and the portion 38 of the spring 18 will bear against the portion 30 of the spring 16 to resist its distortion. If all the springs are distorted in a reverse direction to that indicated by the arrow, the reverse happens, and the portion 38 of the spring 17 will bear against the portion 30 of the spring 15 and the portion 38 of the spring 18 will bear against the portion 42 of the spring 20. If the springs 17 and 18 were extended to pass through the slotted member 22 to engage the same as do the other springs, the device would not have the desired flexibility. By shortening the springs 17 and 18 in relation to the other springs, and with the action above noted, the desired flexibility as well as great tensional strength is obtained, these interposed springs assisting also in maintaining the other springs in contact with the member 22 at all times, thereby eliminating lost motion and preventing chattering.

A further adaptability of the device resides in the fact that the spring 46 performs a useful function, apart from its primary function as above noted, in that it acts to prevent the member 22 fixed to the tie rod from being separated from the ends of the springs in case breakage should occur in any part of the steering mechanism. In such case the device would still continue to operate as long as the tie rod was in connection with one or the other of the knuckles of the steering mechanism.

Having thus fully described my invention, I claim and desire to secure by Letters Patent of the United States:—

1. In an attachment of the character specified, the combination comprising an attachable, spring-holding member, a series of leaf springs fixed to said member to project therefrom, said springs consisting of an inner set of springs, an outer set of springs and a set of springs interposed between said inner and outer sets of springs and shorter in length, an attachable slotted spring-retaining member through the slots in which the outer free ends of said inner and outer sets of springs extend, whereby said springs may exert tension upon said spring-retaining member as the springs are bent laterally in either direction, and means whereby said members may be attached, respectively, one to the axle and the other to a movable portion of the steering mechanism of a vehicle.

2. In an attachment of the character specified, the combination comprising an attachable spring-holding member, a number of leaf springs fixed to said member to project therefrom, said springs consisting of an inner set of springs, an outer set of springs and an intermediate set of springs interposed between the leaves of the inner and outer sets of springs and of shorter length, said springs being nested and arranged whereby they may brace and otherwise yieldingly reinforce one another as all of the springs collectively are bent laterally in reverse directions, an attachable slotted spring-retaining member through the slots in which the outer free ends of said inner and outer sets of springs extend, whereby said springs may exert tension upon said spring-retaining member as the springs are bent laterally in either direction as aforesaid, and means whereby said members may be attached, respectively, one to the axle and the other to a movable portion of the steering mechanism of a vehicle.

3. In an attachment of the character specified, the combination comprising an attachable spring-holding member, a set of leaf springs fixed to said member to project therefrom, a slotted spring-retaining member through the slots in which the outer free ends of said springs extend, and a tensional member interposed between the ends of said springs projecting beyond said slotted member for maintaining the same normally in yielding contact with said slotted member.

4. In an attachment of the character specified, the combination comprising an attachable spring-holding member, a pair of leaf springs fixed to said member and projecting therefrom, said springs having therein just forward of said spring-holding member, bends extending outwardly in reverse directions, a slotted spring-retaining member through the slots in which the outer free ends of said springs extend, other springs reinforcing said pair of leaf springs at the bends therein, and means whereby said members may be attached, respectively, one to the axle and the other to a movable portion of the steering mechanism of a vehicle.

5. In an attachment of the character specified, the combination comprising an attachable spring-holding member, a pair of inner leaf springs fixed to said member and projecting therefrom, said springs having therein, just forward of said spring-holding member, bends extending outwardly in reverse directions, an outer set of leaf springs, and a set of springs interposed between said first-named springs and said outer springs and shorter in length, both said outer and said interposed springs being arranged to yieldingly reinforce said first-named springs at the bends therein and otherwise along the length thereof in the event of lateral distortion, a slotted spring-retaining member through the slots in which the outer free ends of said first-named springs and said outer springs extend, and means whereby said members may be attached, respectively, one to the axle and the other to a movable portion of the steering mechanism of a vehicle.

WELLINGTON TRACY.

Copies of this patent may be obtained for five cents each, by addressing the "Commissioner of Patents, Washington, D. C."